United States Patent
Schulz et al.

(10) Patent No.: US 6,314,486 B1
(45) Date of Patent: Nov. 6, 2001

(54) DATA TRANSFER WITH JTAG CONTROLLER USING INDEX REGISTER TO SPECIFY ONE OF SEVERAL CONTROL/STATUS REGISTERS FOR ACCESS IN READ AND WRITE OPERATIONS WITH DATA REGISTER

(75) Inventors: Jurgen M. Schulz, Pleasanton, CA (US); Tin Y. Lam, London (GB)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/418,623

(22) Filed: Oct. 15, 1999

(51) Int. Cl.[7] ............................ G06F 13/00; G06F 13/38; G06F 12/00; G06F 15/177; G01R 31/28
(52) U.S. Cl. .............................. 710/130; 710/8; 710/9; 710/10; 710/19; 710/36; 710/38; 710/104; 710/129; 711/1; 713/1; 714/726; 714/729
(58) Field of Search ...................... 710/1, 3, 4, 8, 710/9, 10, 15, 17–20, 36–38, 51–53, 104, 129, 130–132; 711/1, 100, 109, 110, 147, 148; 712/1, 200, 220; 713/1, 100; 714/30, 46, 726, 727, 729, 733, 734

(56) References Cited

U.S. PATENT DOCUMENTS

| 4,038,537 | * | 7/1977 | Cassarino, Jr. et al. | 714/805 |
| 5,054,024 | * | 10/1991 | Whetsel | 714/726 |
| 5,422,862 | * | 6/1995 | Wisor | 368/10 |
| 5,446,859 | * | 8/1995 | Shin et al. | 711/100 |
| 5,448,576 | * | 9/1995 | Russell | 714/727 |
| 5,522,086 | * | 5/1996 | Burton et al. | 710/9 |
| 5,859,849 | * | 1/1999 | Parks | 370/395 |
| 6,073,254 | * | 6/2000 | Whetsel | 714/30 |
| 6,188,411 | * | 2/2001 | Lai | 345/513 |

FOREIGN PATENT DOCUMENTS 0 884 598 A1  12/1998  (EP).
WO 98/09220  3/1998  (WO).

* cited by examiner

Primary Examiner—Thomas Lee
Assistant Examiner—Tanh Nguyen
(74) Attorney, Agent, or Firm—Park, Vaughan & Fleming LLP

(57) ABSTRACT

A system for accessing control and status registers for a device within a computer system. These control and status registers are used to control and configure the device and to read status information from the device. The system operates by serially shifting an index into an index register within the device. This index specifies a target register to be accessed within the control and status registers. During a write operation to the target register, the system serially shifts a data value into a data register within the device, and then moves the data value from the data register into the target register. During a read operation from the target register, the system loads a value into the data register from the target register, and serially shifts the value from the data register to a location outside the device to complete the read operation.

20 Claims, 4 Drawing Sheets

DATA TRANSFER WITH JTAG CONTROLLER USING INDEX REGISTER TO SPECIPY ONE OF SEVERAL CONTROL/ STATUS REGISTERS FOR ACCESS IN READ AND WRITE OPERATIONS WITH DATA REGISTER

BACKGROUND

1. Field of the Invention

The present invention relates to control and status registers for controlling and monitoring devices within computer systems. More specifically, the present invention relates to a method and an apparatus for performing read and write operations to control and status registers within a device.

2. Related Art

Processors typically control a device within a computer system through control and status registers (CSRs). In order to determine the state of a device, a processor reads from status registers within the device. In order to configure or control functions of the device, the processor writes to control registers within the device.

As devices have grown increasingly more complex, the number of control and status registers has also increased. Some devices now provide hundreds of control and status registers that can be manipulated by the processor.

In some devices control and status registers are memory-mapped into an address space of the processor so that the processor can directly read from and write to the registers. Unfortunately, other devices do not include such an interface that allows a processor to directly access the control and status registers.

In these devices, control and status registers can be accessed through a serial channel that shifts the desired data values onto and off of the semiconductor chip. Some application specific integrated circuits (ASICs) accomplish this by using a JTAG controller adhering to the IEEE 1149.1 standard. In this type of system, control and status registers are accessed by shifting the data values into a chain of "shadow registers" that temporarily hold copies of the data values for the control and status registers. During a write operation, a chain of data values is shifted into the chain of shadow registers before the shadow registers are copied into the control and status registers in an atomic operation. During a read operation, the control and status register are first copied into the chain of shadow registers in an atomic operation. Next, the shadow registers are shifted off of the chip to complete the read operation. The use of shadow registers allows the control and status registers to be read from and written to in a single atomic operation. This eliminates potential problems in shifting data values through the control and status registers.

Unfortunately, using shadow registers doubles the number of registers required for control and status purposes on the semiconductor chip. This can consume a significant amount of semiconductor real estate for large numbers of control and status registers, which increases the cost of the semiconductor chip. Furthermore, the process of shifting a long chain of shadow registers can be time-consuming, especially if only a single register in the chain needs to be accessed.

What is needed is a method and apparatus for accessing control and status registers for a device that does not require each control and status register to have a corresponding shadow register.

SUMMARY

One embodiment of the present invention provides a system for accessing control and status registers for a device within a computer system. These control and status registers are used to control and configure the device and to read status information from the device. The system operates by serially shifting an index into an index register within the device. This index specifies a target register to be accessed within the control and status registers. During a write operation to the target register, the system serially shifts a data value into a data register within the device, and then moves the data value from the data register into the target register. During a read operation from the target register, the system loads a value into the data register from the target register, and serially shifts the value from the data register to a location outside the device to complete the read operation.

In one embodiment of the present invention, the shifting is performed using a JTAG controller adhering to the IEEE 1149.1 standard. In a variation on this embodiment, the JTAG controller uses separate loops to serially shift the index and the data value. In a variation on the above embodiment, the JTAG controller operates under control of a service processor within the computer system.

In one embodiment of the present invention, the device is located within a semiconductor chip. In another embodiment, the device is located within a circuit board.

In one embodiment of the present invention, the device includes a data routing circuit for routing data between components within the computer system.

In one embodiment of the present invention, status registers from the plurality of control and status registers can be read from and cleared in a single atomic operation.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Computer System

Figure 1:
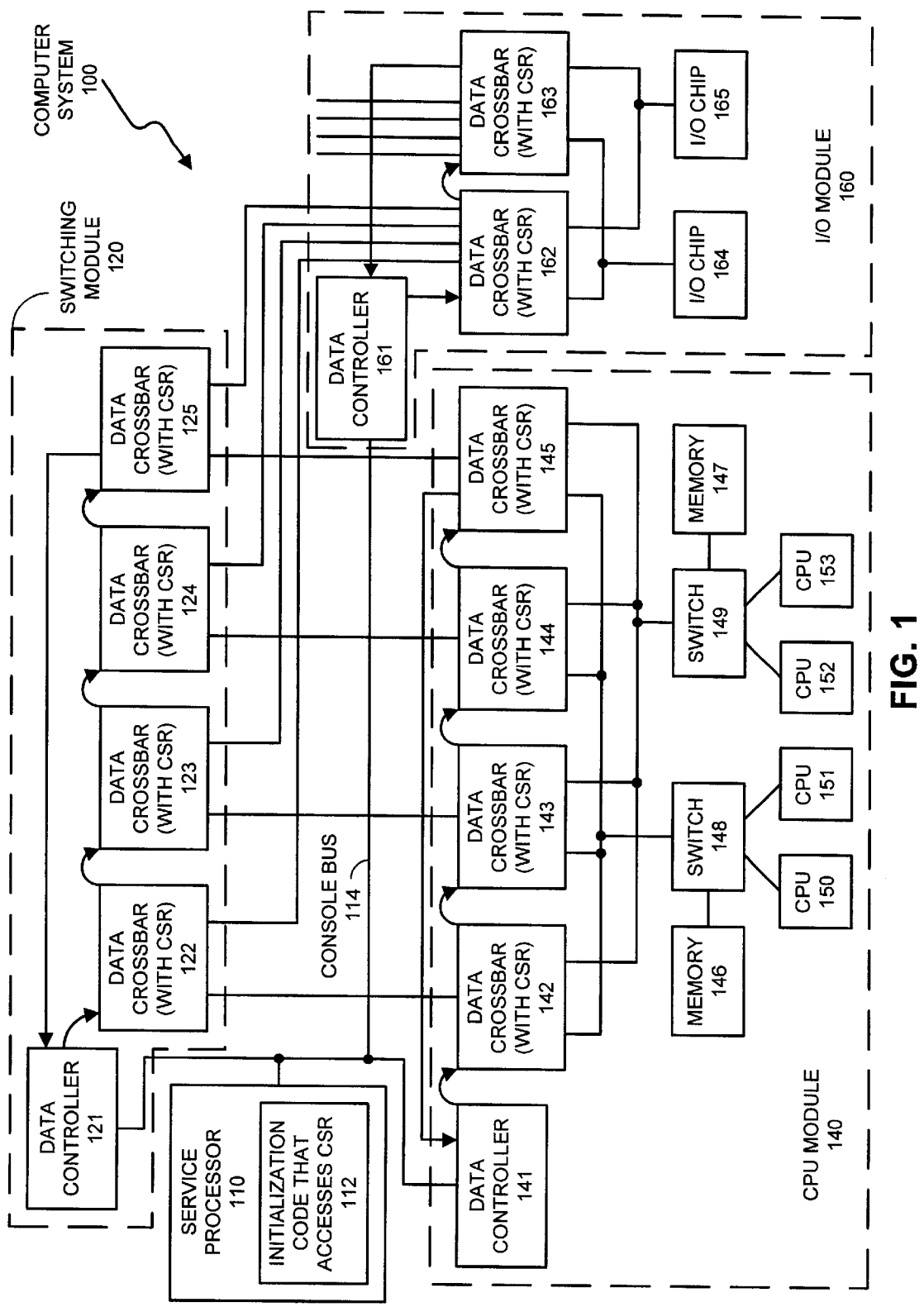
FIG. 1 illustrates a computer system in accordance with an embodiment of the present invention.

FIG. 1 illustrates a computer system 100 in accordance with an embodiment of the present invention. Computer system 100 includes switching module 120, CPU module 140 and I/O module 160. CPU module 140 generally includes processors and memory for computer system 100. I/O module 160 generally includes I/O devices and controllers for peripheral devices for computer system 100. Switching module 120 generally includes switching circuitry for coupling CPU module 140 with I/O module 160. Note that one embodiment of the present invention can include multiple CPU modules and multiple I/O modules so that computer system 100 can be expanded in a modular fashion to provide more computational and I/O capacity.

Service processor 110 communicates with switching module 120, CPU module 140 and I/O module 160 through console bus 114. Service processor 110 can include any circuitry that configures and monitors the status of switching module 120, CPU module 140 and I/O module 160. Console bus 114 can include any type of communication channel through which service processor 110 can communicate with switching module 120, CPU module 140 and I/O module 160.

CPU module 140 includes central processing units (CPUS) 150–153. CPUs 150–153 can include any type of computational engines that can be used within a computer system, including but not limited to, microprocessors, mainframe processors, device controllers, and computational engines within appliances. CPUs 150–151 are coupled to memory 146 through switch 148. CPUs 152–153 are coupled to memory 147 through switch 149. Memories 146 and 147 can include any type of random access memory that can be used store code and/or data for CPUs 150–153. Switches 148–149 can include any type of switching circuitry that can be used to couple CPUs 150–153 with memories 146 and 147.

Switches 148–149 additionally couple CPUs 150–153 with data crossbars 142–145. Data crossbars 142–145 can include any type of switching circuitry that can be used to couple CPU module 140 with other modules in computer system 100. This includes, but is not limited to, switching circuitry based upon a crossbar switch, a shared channel or a staged interconnection. Note that data crossbars 142–145 operate under control of data controller 141. Data controller 141 configures and reads status information from data crossbars 142–145. To this end, data crossbars 142–145 include control and status registers (CSRs) that are manipulated by data controller 141 in accordance with an embodiment of the present invention. In this way, data crossbars 142–145 can be configured to operate in many different configurations.

I/O module 160 includes I/O chips 164–165, which are coupled to data crossbars 162–163. I/O chips 164–165 can include any type of controller or interface for an I/O device or a peripheral device that can be included in computer system 100. This includes, but is not limited to, a graphics controller, a data acquisition card, a sound card, a scanner, a printer, a keyboard, a data storage device, an interface to a personal organizer, a keyboard, a sound card, a modem, a network interface controller (NIC) and a display device. Data crossbars 162–163 can include any type of switching circuitry for coupling I/O module 160 with the rest of computer system 100. Data crossbars 162–163 are chained to data controller 161, which configures and reads status information from data crossbars 162–163.

Switching module 120 includes data crossbars 122–125. Data crossbars 122–125 can include any type of switching circuitry that couples together other modules within computer system 100, including CPU module 140 and I/O module 160. Data crossbars 122–125 are chained to data controller 121, which configures and reads status information from data crossbars 122–125.

During operation, the system illustrated in FIG. 1 operates generally as follows. Service processor 110 sends commands to data controllers 121, 141 and 161. These commands cause data controllers 121, 141 and 161 to shift control and status information into and out of data crossbars 122–125, 142–145 and 162–163, respectively. This allows service processor 110 to configure, control and monitor data crossbars 122–125, 142–145 and 162–163.

Note that data controllers 121, 141 and 161 are coupled to service processor 110 through console bus 114. In one embodiment of the present invention, data controllers 121, 141 and 161 are JTAG controllers that adhere to the IEEE Standard 1149.1-1990 and 1149.1a-1993 IEEE standard Test Access Port and Boundary Scan Architecture.

Also note that although the illustrated embodiment of the present invention operates on control and status registers within data crossbar switches, the present invention can be applied to control and status registers within any device in a computer system (or more generally within a digital system). This can include any type of peripheral device, processor device or memory device with control and/or status registers.

Circuitry to Access Control and Status Registers

Figure 2:
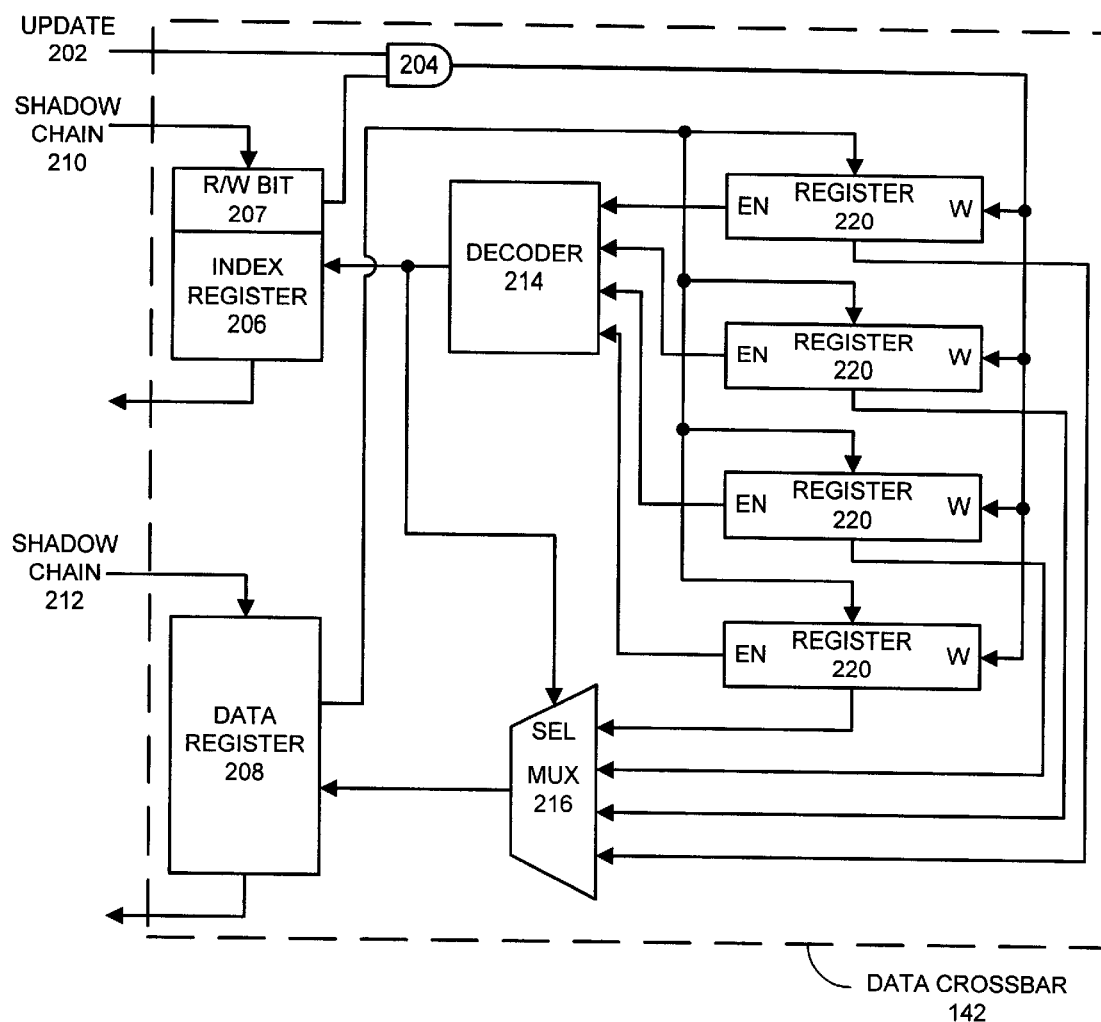
FIG. 2 illustrates circuitry for accessing control and status registers within a device in accordance with an embodiment of the present invention.

FIG. 2 illustrates circuitry for accessing control and status registers within data crossbar 142 in accordance with an embodiment of the present invention. This circuitry facilitates reading from and writing to registers 220–223, which are used for control and status purposes. Instead of having a matching shadow registers for each register 220–223, the present invention provides an index register 206 and a data register 208. Index register 206 selects one of registers 220–223 for a read or a write access, and data register 208 is used to read data from or write data to the selected register.

More specifically, index register 206 is coupled with shadow chain 210, which allows index register 206 to be serially loaded through a JTAG controller 141. Similarly, data register 208 is coupled with shadow chain 212, which allows it to be serially loaded or retrieved through JTAG controller 141.

Index register feeds into decoder 214, which produces a plurality of enable signals that feed into enable inputs of registers 220–223. This enables one of registers 220–223 to be written to during a write operation.

Index register 206 additionally includes R/W bit 207, which assumes a high value for a write operation and a low value for a read operation. R/W bit 207 is ANDed with update signal 202 from controller 141 to produce a write signal that feeds into all of registers 220–223.

Index register 206 additionally feeds into select inputs of multiplexer 216, which select between outputs of registers 220–223 during a read operation.

The output of data register 208 feeds into inputs of registers 220–223 in order to load one of registers 220–223 during a write operation. The input of data register 208 is taken from the output of multiplexer 216 in order to receive data from one of registers 220–223 during a read operation.

The circuitry illustrated in FIG. 2 operates generally as follows. First, index register 206 is loaded through shadow chain 210. During a read operation, the contents of index register 206 feeds into multiplexer 216 to select one of registers 220–223 to be loaded into data register 208. Once data register 208 is loaded, the system retrieves the contents of data register 208 through shadow chain 212 to complete the read operation.

During a write operation, the contents of index register 206 feeds into decoder 214 to enable one of registers 220–223 for writing. Next, data register 208 is loaded with a value to be written through shadow chain 212. The value to be written is then fed into the data inputs of registers 220–223, Next, update signal 202 causes the enabled register to be loaded with the value to be written.

Although FIG. 2 illustrates only four control and status registers 220–223, the present invention can be applied to systems with hundred or even thousands of control and status registers, also note that data crossbar 142 contains additional circuitry (not shown) for switching signals between switch 148 and switching module 120.

Process of Accessing Control and Status Registers

Figure 3:
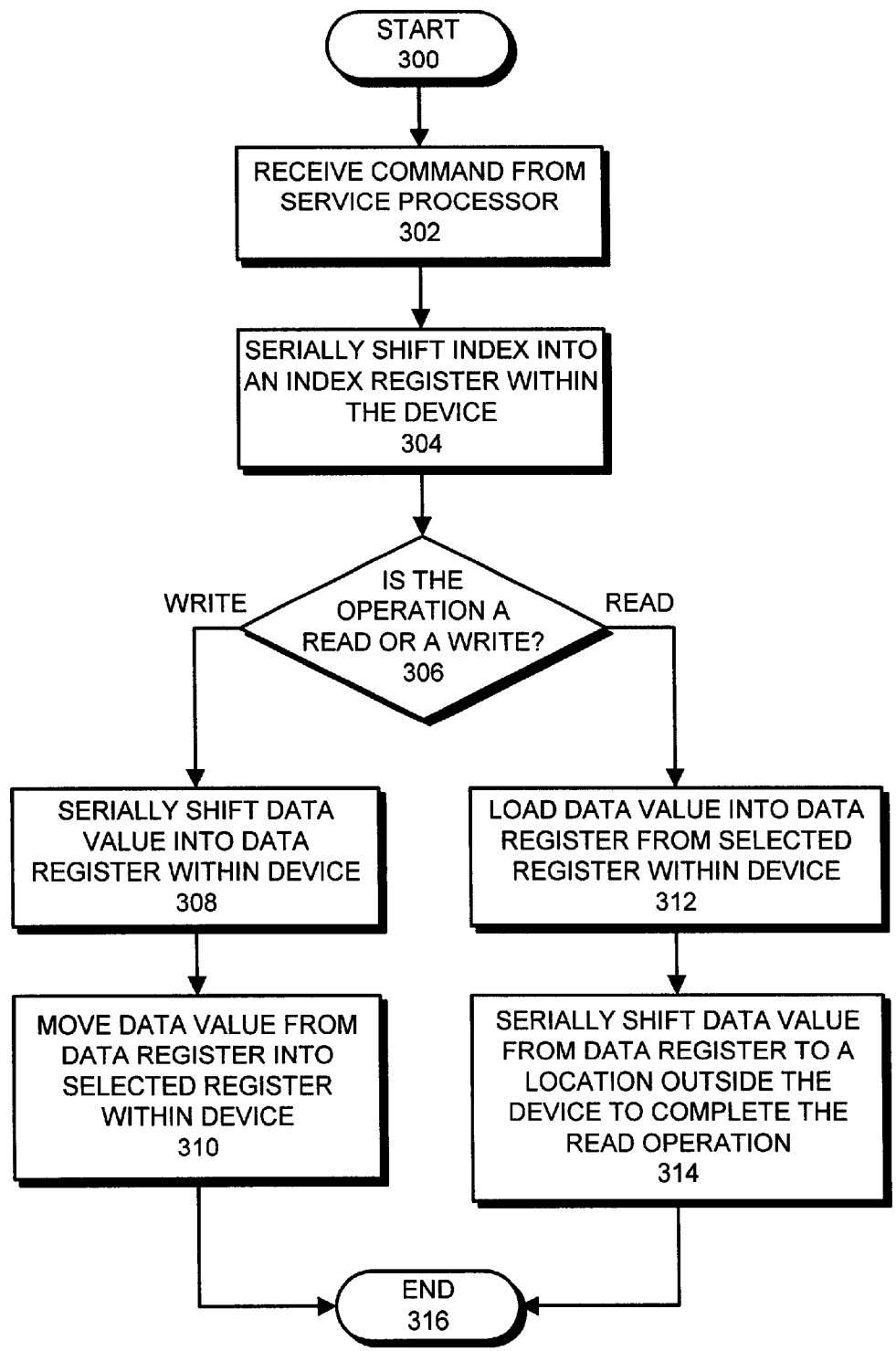
FIG. 3 is a flow chart illustrating the process of accessing control and status registers in accordance with an embodiment of the present invention.

FIG. 3 is a flow chart illustrating the process of accessing control and status registers in accordance with an embodiment of the present invention. First, data controller 141 (in FIG. 1) receives a command to access a control or status register from service processor 110 (step 302). Next, data controller 141 serially shifts an index into index register 206 within data crossbar 142 using shadow chain 210 (step 304). This index selects one of registers 220–223. The system also determines whether the operation is a read operation or a write operation (step 306).

If the operation is a write operation, the system serially shifts a data value into data register 208 through shadow chain 212 (step 308). Next, the system moves the data value from data register 208 into the selected register to complete the write operation (step 310).

If the operation is a read operation, the system loads a data value from the selected register into data register 208 (step 312). Next, the system serially shifts the data value from data register 208 to a location outside of data crossbar 142 to complete the read operation (step 314). In one embodiment of the present invention, status registers are designed so that reading a value from a status register causes the status register to be cleared. This feature can be implemented using a status register with a "write one to clear" feature.

Figure 4:
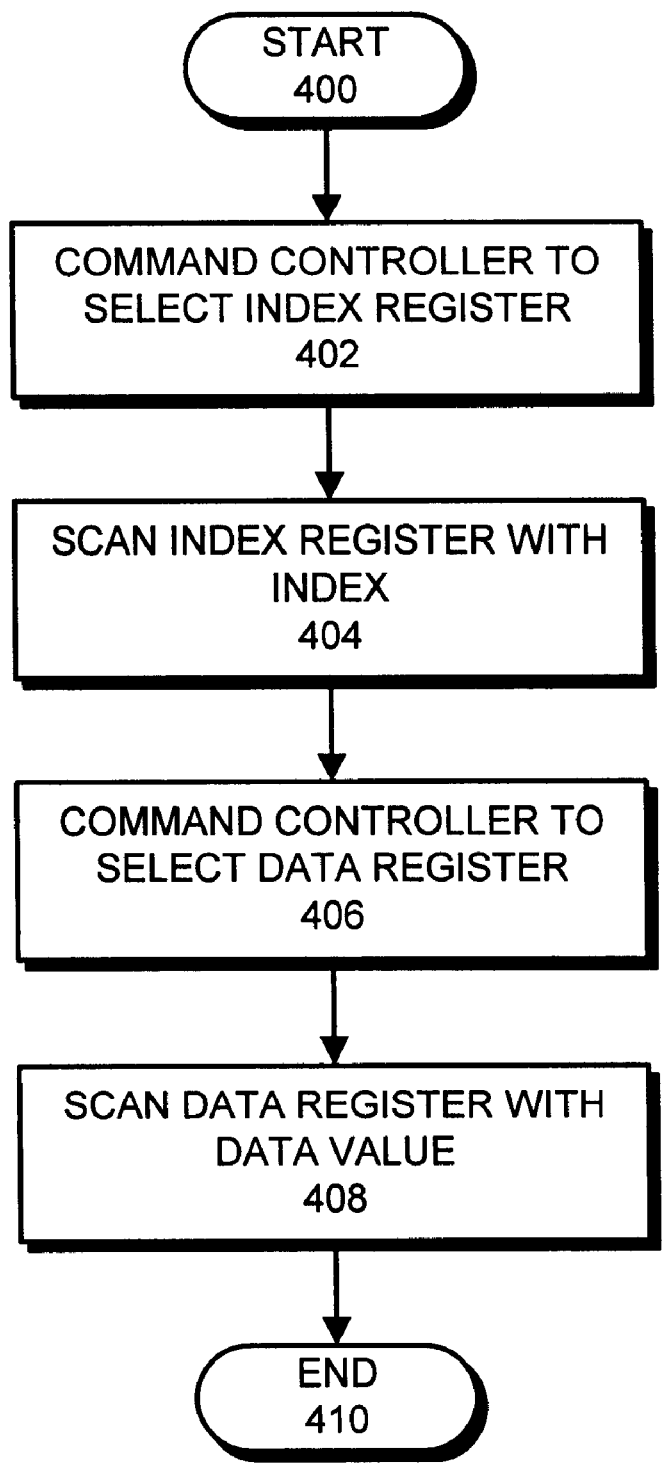
FIG. 4 is a flow chart illustrating the process of using a JTAG controller to access control and status registers in accordance with an embodiment of the present invention.

FIG. 4 is a flow chart illustrating the process of using data controller 141 to access control and status registers in accordance with an embodiment of the present invention. First, service processor 110 commands data controller 141 to select index register 206 (step 402). Next, an index is scanned into index register 206 (step 404). After index register 206 is loaded, service processor 110 commands data controller 141 to select data register 208 (step 406). Next, data register 208 is scanned with a data value (step 408). During a write operation, the data value is scanned into data register 208 from data controller 141. During a read operation, the data value is scanned into data controller 141 from data register 208.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for accessing a plurality of control and status registers for a device within a computer system, the plurality of control and status registers being used to configure the device and to read status information from the device, the method comprising:

serially shifting an index into an index register within the device, the index specifying a register to be accessed from the plurality of control and status registers;

during a write operation to the register to be accessed,
serially shifting a data value into a data register within the device, and
moving the data value from the data register into the register to be accessed; and during a read operation from the register to be accessed,
loading a value into the data register from the register to be accessed, and
serially shifting the value from the data register to a location outside the device to complete the read operation;

wherein the act of serially shifting the index and the act of serially shifting the data value take place through separate loops maintained by a JTAG controller; and wherein the index register is a register different from the data register.

2. The method of claim 1, wherein the JTAG controller adheres to the IEEE 1149.1 standard.

3. The method of claim 2, further comprising operating the JTAG controller under control of a service processor within the computer system.

4. The method of claim 1, wherein the device is located within a semiconductor chip.

5. The method of claim 1, wherein the device is located within a circuit board.

6. The method of claim 1, wherein the device is a data routing circuit for routing data between components within the computer system.

7. The method of claim 1, wherein the method is performed during a system configuration operation.

8. The method of claim 1, wherein the data register is as wide as a largest register from the plurality of control and status registers.

9. The method of claim 1, wherein status registers from the plurality of control and status registers can be read from and cleared in a single operation.

10. An apparatus that accesses a plurality of control and status registers for a device within a computer system, the plurality of control and status registers being used to configure the device and to read status information from the device, the apparatus comprising:

an address loading mechanism that is configured to serially shift an index into an index register within the device, the index specifying a register to be accessed from the plurality of control and status registers; and a data accessing mechanism that is configured to retrieve data from one of the plurality of control and status registers during a read operation, and to move data into one of the plurality of control and status registers during a write operation;

wherein during the write operation the data accessing mechanism is configured to,
serially shift a data value into a data register within the device, and to
move the data value from the data register into the register to be accessed;

wherein during the read operation the data accessing mechanism is configured to,
load a value into the data register from the register to be accessed, and to
serially shift the value from the data register to a location outside the device to complete the read operation;

wherein a JTAG controller is configured to provide separate loops for serially shifting the index and serially shifting the data value; and wherein the index register is a register different from the data register.

11. The apparatus of claim 10, wherein the JTAG controller adheres to the IEEE 1149.1 standard.

12. The apparatus of claim 11, further comprising a service processor within the computer system for operating the JTAG controller.

13. The apparatus of claim 10, wherein the device is located within a semiconductor chip.

14. The apparatus of claim 10, wherein the device is located within a circuit board.

15. The apparatus of claim 10, wherein the device includes a data routing circuit for routing data between components within the computer system.

16. The apparatus of claim 10, further comprising a system initialization mechanism that sets control registers from within the plurality of control and status registers using the address loading mechanism and the data accessing mechanism.

17. The apparatus of claim 10, wherein the data register is as wide as a largest register from the plurality of control and status registers.

18. The apparatus of claim 10, wherein status registers from the plurality of control and status registers are configured so that they can be read from and cleared in a single operation.

19. A computer system that is configured to access a plurality of control and status registers, comprising:

a processor;

a memory;

a device coupled to the processor;

the plurality of control and status registers within the device, the plurality of control and status registers allowing the processor to configure the device and to read status information from the device;

an address loading mechanism that is configured to serially shift an index into an index register within the device, the index specifying a register to be accessed from the plurality of control and status registers; and a data accessing mechanism that is configured to retrieve data from one of the plurality of control and status registers during a read operation, and to move data into one of the plurality of control and status registers during a write operation;

wherein during the write operation the data accessing mechanism is configured to, serially shift a data value into a data register within the device, and to move the data value from the data register into the register to be accessed;

wherein during the read operation the data accessing mechanism is configured to, load a value into the data register from the register to be accessed, and to serially shift the value from the data register to a location outside the device to complete the read operation;

wherein a JTAG controller is configured to provide separate loops for serially shifting the index and serially shifting the data value; and wherein the index register is a register different from the data register.

20. A computer readable storage medium storing instructions that when executed by a computer cause the computer to perform a method for accessing a plurality of control and status registers for a device within a computer system, the plurality of control and status registers being used to configure the device and to read status information from the device, the method comprising:

serially shifting an index into an index register within the device, the index specifying a register to be accessed from the plurality of control and status registers;

during a write operation to the register to be accessed, serially shifting a data value into a data register within the device, and moving the data value from the data register into the register to be accessed; and during a read operation from the register to be accessed, loading a value into the data register from the register to be accessed, and serially shifting the value from the data register to a location outside the device to complete the read operation;

wherein the act of serially shifting the index and the act of serially shifting the data value take place through separate loops maintained by a JTAG controller; and wherein the index register is a register different from the data register.

* * * * *